US008088267B2

(12) United States Patent
James et al.

(10) Patent No.: US 8,088,267 B2
(45) Date of Patent: Jan. 3, 2012

(54) METHOD AND APPARATUS FOR ELECTROKINETIC TRANSPORT

(75) Inventors: Patrick Ismail James, Madison, WI (US); George Stejic, Arlington, VA (US)

(73) Assignee: Tesla Laboratories, Arlington, VA (US)

( * ) Notice: Subject to any disclaimer, the term of this patent is extended or adjusted under 35 U.S.C. 154(b) by 936 days.

(21) Appl. No.: 12/060,866

(22) Filed: Apr. 2, 2008

(65) Prior Publication Data

US 2009/0250428 A1    Oct. 8, 2009

(51) Int. Cl.
     *B03C 5/02*      (2006.01)
(52) U.S. Cl. ........... 204/547; 204/643; 417/49; 137/825
(58) Field of Classification Search ................. 204/643, 204/547; 422/546; 137/825, 826; 361/226; 417/48–50
See application file for complete search history.

(56) References Cited

U.S. PATENT DOCUMENTS

| 4,639,244 | A | 1/1987 | Rizk et al. |
| 5,041,107 | A | 8/1991 | Heil, Jr. |
| 6,699,211 | B2 | 3/2004 | Savage |
| 6,955,670 | B2 | 10/2005 | Martin et al. |

OTHER PUBLICATIONS

Adamson, A. W. and A. P. Gast, Physical Chemistry of Surfaces, Sixth Edition, John Wiley & Sons, Inc., New York: 1997, p. 171-172.*
Cui, L. and H. Morgan, "Design and fabrication fo travelling wave dielectrophoresis structures", Journal of Micromachanics and Microengineering, vol. 10, No. 1, Mar. 2000, p. 72-79.*
Morgan, H. et al., "Large-area travelling-wave dielectrophoresis particle separator", Journal of Micromachanics and Microengineering, vol. 7, No. 2, Jun. 1997, p. 65-70.*
U.S. Appl. No. 10/198,550, filed Jan. 30, 2003, Yevin.
U.S. Appl. No. 10/417,859, filed Feb. 26, 2004, Martin et al.
U.S. Appl. No. 10/170,774, filed Jan. 16, 2003, Martin et al.
U.S. Appl. No. 10/066,528, filed Jul. 31, 2003, Rakestraw et al.
U.S. Appl. No. 10/788,629, filed Aug. 26, 2004, Rakestraw et al.
U.S. Appl. No. 10/894,994, filed Dec. 30, 2004, Martin et al.
U.S. Appl. No. 11/279,515, filed Aug. 31, 2006, Hansford et al.
U.S. Appl. No. 11/144,100, filed Dec. 7, 2006, Sheng et al.

* cited by examiner

*Primary Examiner* — J. Christopher Ball
(74) *Attorney, Agent, or Firm* — Miodrag Cekic; Intellectual Property Strategists, LLC

(57) ABSTRACT

Controlled electrokinetic transport of constituents of liquid media can be achieved by connecting at least two volumes containing liquid media with at least one dielectric medium with opposing dielectric surfaces in direct contact with said liquid media, and establishing at least one conduit across said dielectric medium, with a conduit inner surface surrounding a conduit volume and at least a first opening and a second opening opposite to the first opening. The conduit is arranged to connect two volumes containing liquid media and includes a set of at least three electrodes positioned in proximity of the inner conduit surface. A power supply is arranged to deliver energy to the electrodes such that time-varying potentials inside the conduit volume are established, where the superposition of said potentials represents at least one controllable traveling potential well that can travel between the opposing conduit openings.

26 Claims, 3 Drawing Sheets

METHOD AND APPARATUS FOR ELECTROKINETIC TRANSPORT

STATEMENT REGARDING FEDERALLY SPONSORED RESEARCH AND DEVELOPMENT

This invention was made and reduced to practice using US government funding under National Avionics and Space Administration (NASA) Small Business Innovation Research (SBIR) grant NNJ07JB16C. The US government has certain rights in this invention.

FIELD OF THE INVENTION

This invention disclosure relates to the apparatus, method, and fabrication of an innovative micro-pump. It describes a novel pumping structure which achieves transport of dissolved or dispersed substances (even against concentration gradients) and discusses how the targeted pumping action is achieved by the structure. This results in a versatile pump capable of moving a variety of inorganic and/or biologically relevant substances.

BACKGROUND OF THE INVENTION

Robust and reliable pumps are in increasing demand for use in the pharmaceutical industry, medicine, automated sampling and processing industrial applications, etc. Miniaturized pumps for transport of liquids through conduits with micro or nano-scale cross-sections are of particular interest in high technology applications like biochip processors, self-contained and/or implantable drug delivery devices. Miniaturized pumps using mechanical parts frequently do not have the required reliability and long term stability of operation which is routinely required in the field of biochips and/or implantable drug delivery devices.

Electrokinetic pumps that operate without moving mechanical parts are known to operate on the principle of Electroosmotic Flow (EOF). Such devices offer improved reliability over mechanical pumps but frequently suffer from impurity sensitivities and limitations pertinent to the requirement to employ chemical surface derivatization to control the polarization of solid surfaces exposed to the pumped liquids. Because of the polarizability induced limitations EOF devices require special attention to the conduit wall materials and conditions on the surfaces immersed in the pumping fluids. This limits the utility of the EOF devices to pumping of compatible fluids only. Frequently, close monitoring and maintenance of pumping fluid temperature and/or pH value ranges is required for the reliable operation of the EOF devices.

In contrast to the EOF electrokinetic micro and nano pumps, pumps in accordance with the current invention utilize for the pumping action only voltages generated by external power supplies. One direct benefit of such arrangement is that the charge induced by the externally applied potentials dominate the resultant electrochemical potentials generated on the device contact surfaces. This allows for utilization of a broad variety of materials in the design and applications of micro-pumps capable to drive transport of a broad spectrum of substances ranging from reactive inorganic solutions to complex compositions and mixtures of biomedicaly relevant materials.

SUMMARY OF THE INVENTION

Controlled electrokinetic transport of constituents of liquid media can be achieved by connecting at least two volumes containing liquid media with at least one dielectric medium with opposing dielectric surfaces in direct contact with said liquid media, and establishing at least one conduit across said dielectric medium, with a conduit inner surface surrounding a conduit volume and at least a first opening and a second opening opposite to the first opening. The conduit is arranged to connect two volumes containing liquid media and includes a set of at least three electrodes positioned in proximity of the inner conduit surface. A power supply is arranged to deliver energy to the electrodes such that time-varying potentials inside the conduit volume are established, where the superposition of said potentials represents at least one controllable traveling potential well that can travel between the opposing conduit openings.

An electrokinetic apparatus for controlled transport of constituents of liquid media including at least two volumes containing liquid media, at least one dielectric medium with opposing dielectric surfaces in direct contact with said liquid media, at least one conduit across said dielectric medium, with a conduit inner surface surrounding a conduit volume and at least a first opening and a second opening opposite to the first opening, the conduit is arranged to connect two volumes containing liquid media and comprises a set of at least three electrodes positioned in proximity of said inner conduit surface, and a power supply arranged to deliver energy to the electrodes such that time-varying potentials inside the conduit volume are established, where the superposition of said potentials represents at least one controllable traveling potential well that can travel between the opposing conduit openings.

A method for manufacturing of an electrokinetic apparatus that includes: preparing and cleaning a wafer, masking and patterning a back side of the wafer, insulating a front side of the wafer and depositing conductor/insulator multilayer over the insulation on the front side, etching an access well on the back side of the wafer, masking and patterning a device patterns over the multilayer, etching the device patterns, and passivation of conductors exposed by etching through the conductor/insulator multilayer is also disclosed.

DESCRIPTION OF THE INVENTION

An apparatus in accordance to one embodiment of the current invention creates a traveling potential well in liquid media, including but not limited to, solution, colloid solutions, and suspension. The traveling potential is arranged to achieve a peristaltic type pumping action acting upon ionized, charged, or polarized constituents present in the liquid.

Figure 1:
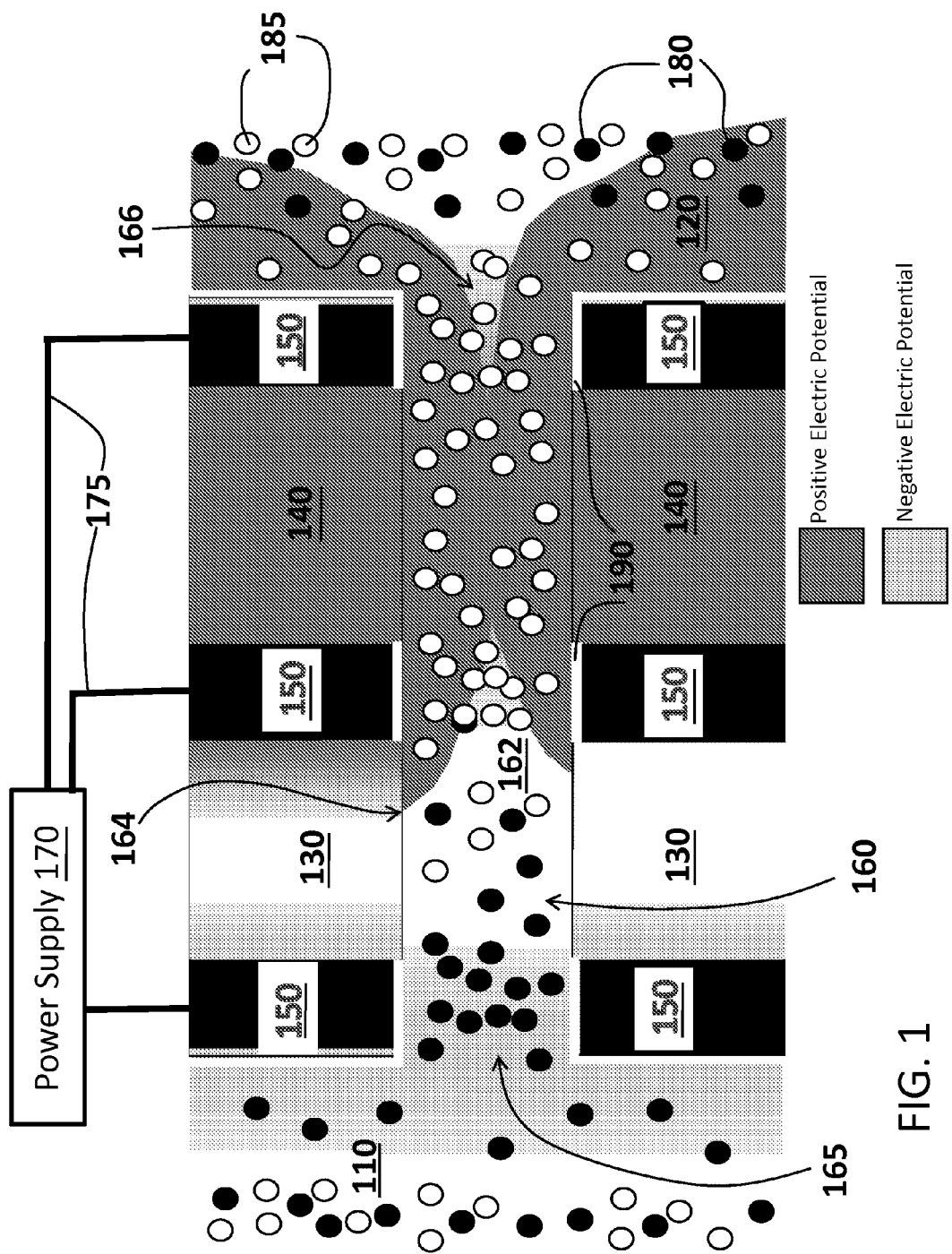
FIG. 1. is a schematic cross-sectional side view of an apparatus in accordance with one embodiment of the present invention.

A schematic view of the pump device in accordance with an embodiment that uses three electrodes and two insulating layers is shown in FIG. 1. At least two volumes, 110 and 120, containing liquid media are connected via at least one conduit 160 incorporating a conduit volume 162, inner conduit surface 164, and at least two openings of which a first opening 165 and a second opening 166 opposite to the first opening. The conduit is arranged to connect two volumes 110 and 120 containing liquid media, and comprises a set of at least three electrodes 150 positioned in proximity of said inner conduit surface 164. The electrodes 150 are operatively connected via conductors 175 to an external power supply 170 arranged to deliver energy to the electrodes such that time-varying potentials inside the conduit volume 162 are established. The superposition of said potentials represents at least one controllable traveling potential well that can travel between the opposing conduit openings 165 and 166. The traveling potential well is arranged to selectively capture constituents of liquid medium in a vicinity of the first opening 165 and transports the constituents to the vicinity of the second opening 166.

In the embodiment shown in FIG. 1, the electrodes 150 are passivated by application of a thin inert dielectric layer 190 deposited at all electrode-liquid interfaces. Passivation restricts net electron transport from occurring at the electrodes. This both reduces power consumption and avoids chemical perturbation of the system.

For the convenience of conceptual simplicity, the pump of the embodiment depicted in FIG. 1 is shown acting on separate and distinct positively charged particles 180 and negatively charged particles 185. The schematic in FIG. 1 is representative for the embodiments in which the liquid media comprise ionizing compounds dissolved in supporting solutions. The particles of those embodiments 180 may include various species of inorganic or organic cations in different charge states and mixtures thereof. Particles 185 may include various inorganic or organic anions and their mixtures. The supporting solutions of different embodiments may be chosen from the set of solutions consisting of liquid organic compounds, liquid inorganic compounds, and mixtures of liquid organic compounds and liquid inorganic compounds. For example, the supporting solution chosen from the set of solutions consisting of water, methanol, ethanol, all isomers of propanol, acetonitrile, carbon dioxide, ammonia, methylethyl ketone, tehydrofuran, dimethylsulfoxide, and mixtures thereof may be used in different embodiments of the current invention.

Furthermore, FIG. 1 depicts the embodiment using two different dielectrics 130 and 140 separating proximal electrodes 150. Embodiments with more than one kind of dielectrics may offer more design flexibility and more degrees of freedom for the design optimization. It is also understood that in addition to homogeneous dielectrics, composite dielectrics that include more than one distinct dielectric material can be used. Also, dielectrics characterized by gradient properties which change, for example along the conduit length, may be used in some embodiments of the present invention.

It is also understood that appropriately scaled pumps constructed in accordance with the current invention may work with other charged nano, micro, mezzo, and macro particles such are charged colloidal particles, charged clusters, charged particle aggregates, or solid micro, mezzo, and macro particles suspended in solutions. It should be also added that embodiments of pumps configured in accordance with present invention may operate on neutral particles with permanent or induced dipole moment like molecular or radical dipoles. This particular group of embodiments will be discussed in more detail below.

Regarding the embodiment in FIG. 1, as the passivated electrodes 150 are powered by the power supply 170, they accumulate charge and act like plates in a capacitor. Ions 180 and 185 in the liquid medium are then attracted to the charged electrodes 150 as shown in FIG. 1. The anions 185 group around the temporarily positive electrodes and while the cations 180 group around the temporarily negative electrode.

The result is a localized concentration and separation of the charged species present in the solution over fairly short length scales. The standard diffuse double layer model for charge distribution around electrodes in the liquid phase is overly simplistic but yields general electric field and potential shapes and trends with distance from the electrode appropriate to describing this charge accumulation (see, e.g. C. Brett, A. Brett. "Electrochemistry: Principles, Methods, and Applications," Oxford University Press New York, N.Y. (1993); referred further as "Brett & Brett" and incorporated here by reference in its entirety).

Brett & Brett also discuss a more sophisticated Gouy-Chapman model of the double layer which indicates that the ion concentrations follow Boltzmann statistics as a function of distance from the electrode into the bulk solution; falling off over a characteristic distance which is dependent on the square root of the ion concentration (typically this distance ranges from roughly 1 nm to 0.5 μm in aqueous systems).

Figure 2:
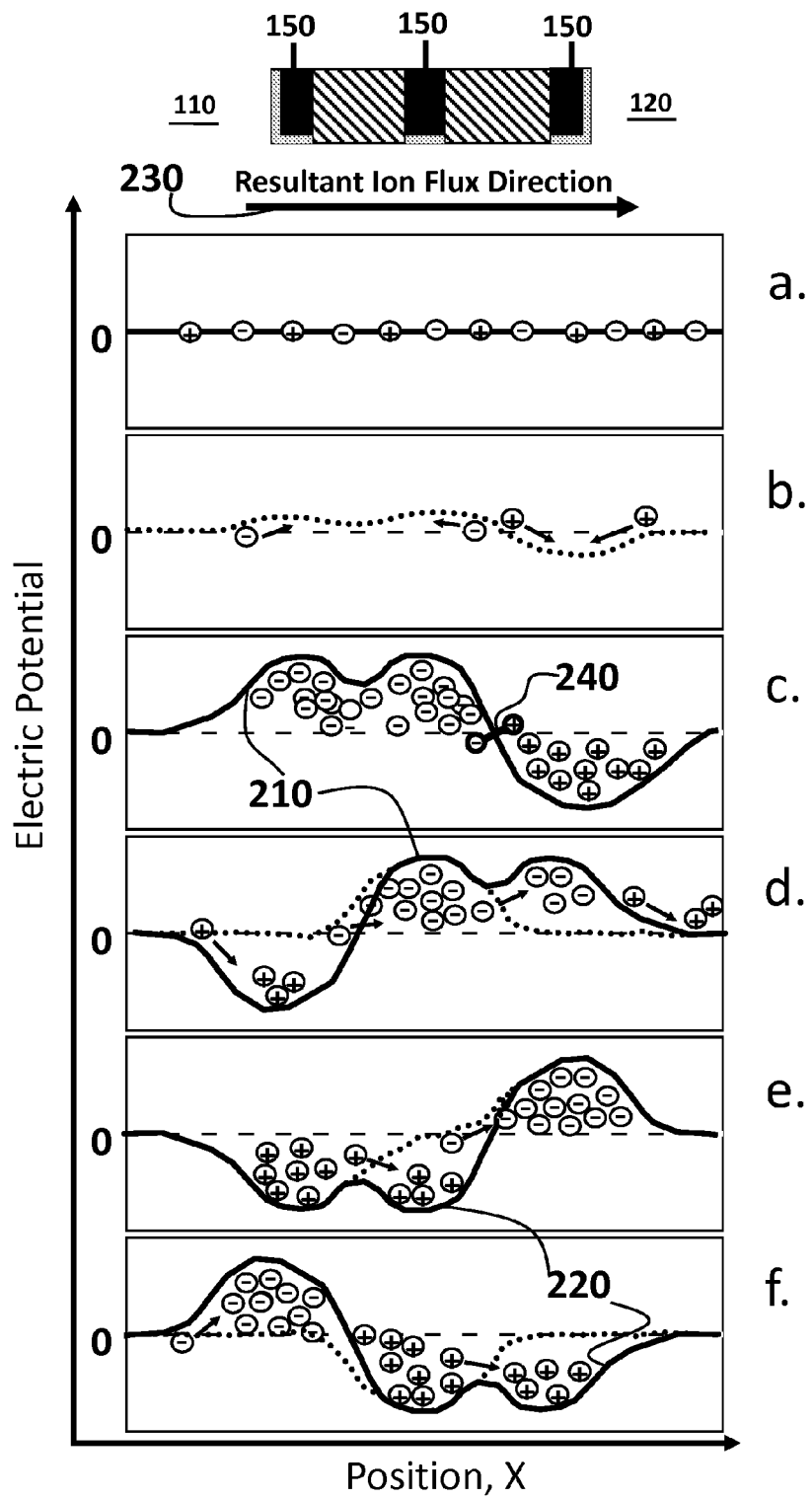
FIG. 2. is a schematic view of potentials in an apparatus in accordance with one embodiment the present invention.

Establishment and operation of the traveling potential well structure 210 is depicted schematically in FIG. 2, in accordance with one embodiment of the current invention. In this embodiment, a conduit with a set of three electrodes 150 is arranged between the liquid volumes 110 and 120. The power supply of this embodiment is arranged to generate sinusoidal voltage (with period T) on each of three terminals connected the three electrodes 150. The voltage on each terminal exhibits equal amplitudes but the phases are shifted relative to each other by introduction of 90° subsequent relative phase angles (i.e. initial electrode exhibit phase angle 0°, next (middle) electrode exhibits phase angle 90°, while the electrode on the opposite end of the conduit exhibits relative phase angle 180° relative to the initial electrode).

FIGS. 2a. and 2b. depict the establishment of the potential distribution profiles in space immediately after application of the electrode biasing potentials supplied the power supply. Potential profiles in FIGS. 2c.-2f. represent "snap shots" at time points t=0 (FIG. 2c.), t=T/6 (FIG. 2d.), t=T/3 (FIG. 2e.), and t=T/2 (FIG. 2f.) after the rise time period, where the rise time is shorter than the cycling period T.

In addition to the transportation of ions or other charged particles, traveling potential wells 210 and 220 can transfer dipoles. A dipole 240 is represented schematically in FIG. 2c. at a position associated with maximum electric field gradients. As the dipoles move under forces proportional to gradients of electric fields, the volumes in the vicinity of field maxima and minima act as traps for dipoles and can be used as traveling structures capable of producing pumping effects in the general direction 230 of ion flux. It is important to notice that embodiments of the present inventions optimized for transport of dipoles may differ in geometric or structural details from the embodiment depicted in FIG. 2.

Figure 3:
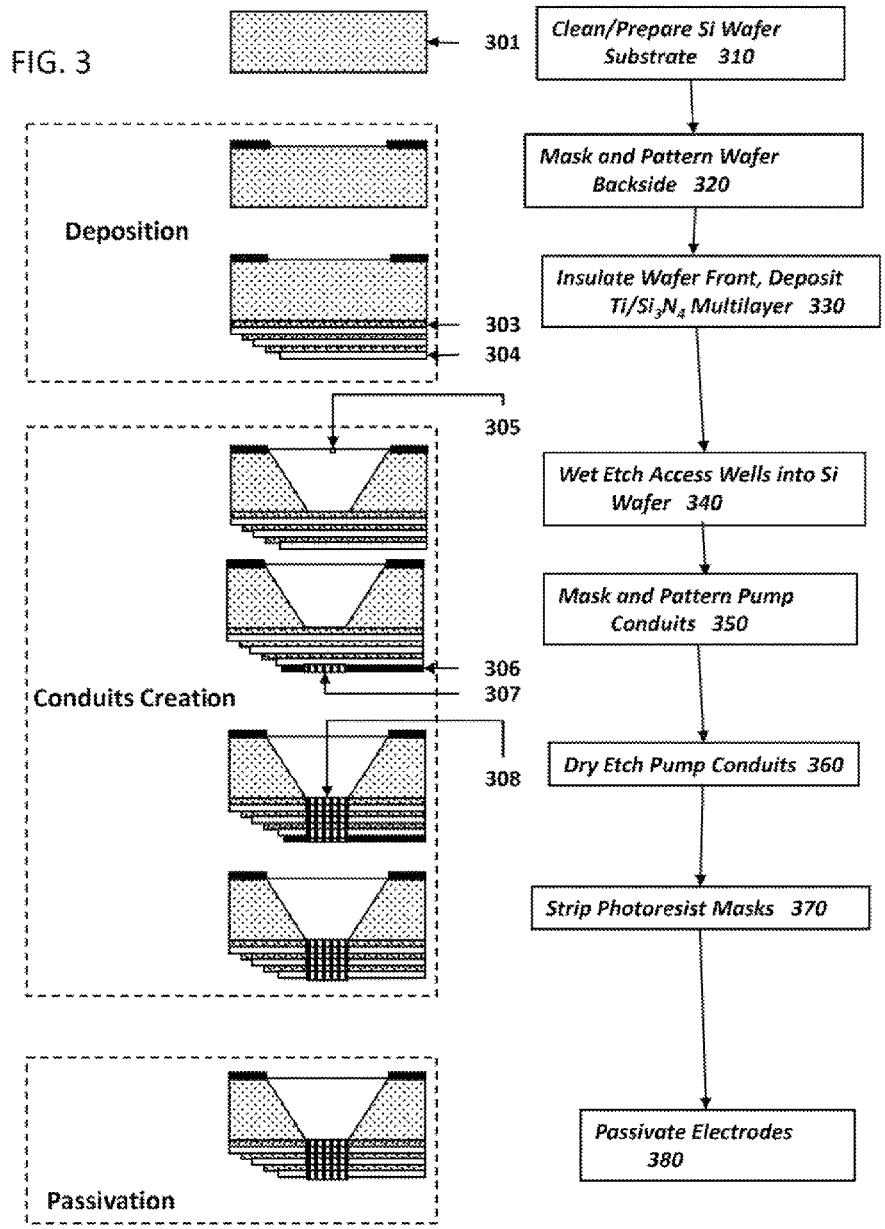
FIG. 3. is a flow chart of a method for manufacturing of an electrokinetic apparatus in accordance with one embodiment of the present invention.

A method of fabrication of a pump structure in accordance with one embodiment of current invention is shown in the flow chart depicted in FIG. 3. Here the steps of the fabrication process are noted as are the materials employed to the device of the depicted embodiments. It is understood that many known alternative processes and compatible materials can be also used in fabrication of different embodiments. The device is depicted in cross-section in a manner which allows direct relationship to the more conceptual depictions of FIGS. 1 and 2.

Initial step 310 includes preparation of standard Si wafer 301. Step 320 includes patterning and masking backside (relative and opposite to the conduit structure which is, by convention, generated on the front side of the wafer 301). Step 330 includes deposition of an insulating $Si_3N_4$ layer 303 on the wafer front and subsequent deposition of a $Ti/Si_3N_4$ multilayer containing at least three Ti layers 304 mutually insulated by interlying $Si_3N_4$ layers. Step 340 incorporates wet etch of an access well 305 in the Si wafer 301. Masking and patterning of pump conduit structure 307 using patterned photoresist 306 is performed by step 350. Step 360 incorporates dry etch of pump conduits 308. Striping ("ashing") of photoresist 306 is performed in step 370. Passivation of electrodes by anodization of the surface of exposed Ti in the multilayer and conduits deposition is performed in final step 380.

It is understood that other electrode materials, including but not limited to yttrium, titanium, zirconium, hafnium, vanadium, niobium, tantalum, chromium, molybdenum, tungsten, iron, cobalt, rhenium, iridium, nickel, palladium, platinum, copper, silver, gold, zinc, cadmium, aluminum, tin, lead, antimony, bismuth, and alloys thereof may also be used in various embodiments of the present invention. Also, different dielectrics, including but not limited to silicon dioxide, silicon nitride, silicon carbide, magnesium oxide, diamond, strontium titanate, lanthanum titanate, titanium dioxide, lead magnesium niobate, lead oxide, lucite, polystyrene, polyvinyl chloride, teflon, amber, and mixtures thereof may be used to insulate compatible electrode conductors.

The disclosed method is compatible with embodiments having multilayer thickness to at least 5-10 conduit 160 diameters. In an embodiment with 1 μm diameter conduits 160, for example, the characteristic diffusion length in the device may be approximately 2 μm (L=1E-6 m). The unbiased diffusion time (i.e. the device frequency response lower limit) is normally taken as diffusion length divided by the square root of the diffusivity ($t=L^2/D$). Typical simple ion diffusivities (~1-2E-9 $m^2/s$) are consistent with a device response time on the order of 10 ms. (100 Hz). Diffusion of material into the conduit volume 162 may also be considered. For conduits 160 with diameters of less than about 25 μm, spherical diffusion may dominate and may be faster than the linear diffusion occurring within the conduit, and thus will not be limiting until very low ion concentrations, where insufficient ions to form the double layer can diffuse to the electrode in the device response time. Also, spacing of the conduits may need to be sufficient (typically about 10 diameters) to prevent localized solute depletion leading to mass transfer limitations on the inlet side of the conduit and will thus provide the upper conduit density where the pores can be considered to operate in an isolated fashion.

In some embodiments of the current invention, conduits with other than circular or nonuniform cross-sections may be used. For these devices an effective conduit diameter obtained by averaging the cross-sectional areas and replacing it with areas of an effective circular cross-section may be introduced. For different applications, conduits with effective diameters up to 1000 Debye lengths may be effective. In these large effective diameter embodiments, liquid media transport may also rely on viscosity between ionized and neutral liquid constituents. For the embodiments where the pump is arranged to act predominantly upon neutral constituents, the Debye length concept is of limited use. In these embodiments, effective conduit diameter may be optimized on the basis of liquid viscosity and constituents' concentrations. Conduits with effective diameters between 1 nm and 1000 μm may be effective for variety of applications.

Amplitude depths of potential wells 210, 220 are ultimately limited by the largest inter-electrode potential differences that would not result in structural damages by arcing. Well designed devices of embodiments optimized to transport electrolytes may reliably take less than approximately 500 V of inter-electrode voltages. For very large conduits (e.g. 1 mm diameter) in embodiments with liquids containing polarized constituents with induced dipoles, 5000 V of inter-electrode potential differences may be achievable when high voltage design and exploitation procedures are observed.

We claim:

1. A method for controlled electrokinetic transport of at least one liquid medium comprising:

connecting at least two volumes containing at least one liquid medium by placing at least one conduit across at least one dielectric medium with opposing dielectric surfaces in direct contact with the at least one liquid medium by establishing at least one conduit across the at least one dielectric medium, with a conduit inner surface surrounding a conduit volume and enclosing an enclosed portion of the at least one liquid medium, and at least a first opening and a second opening opposite to the first opening such that the at least one conduit is arranged to connect the at least two volumes containing the at least one liquid medium and the at least one conduit incorporates a set of at least three electrodes positioned in proximity of the inner conduit surface such that a dielectric layer separates the set of at least three electrodes from the enclosed portion of the at least one liquid medium;

operatively connecting the at least three electrodes to a power supply arranged to deliver and remove an electric charge and distribute it on the each one of the at least three electrodes such that the electric charge on the each of at least three electrodes corresponds to a time-varying electric potential inside the conduit volume such that a superposition of the time-varying electric potentials represents at least one controllable traveling potential well arranged to travel between the first opening and the second opening opposite to the first opening and to transfer an average momentum in a direction to the second opening to the enclosed portion of the at least one liquid medium such that the enclosed portion of the at least one liquid medium may be controllably transported between the at least two volumes.

2. The method of claim 1 further comprising programming the power supply to deliver and remove the electric charge in cycles such that the traveling potential well periodically travels between the first opening and the second opening opposite to the first opening.

3. The method of claim 2 where the traveling potential well is arranged to selectively capture constituents of liquid medium in a vicinity of the first opening and transports the constituents to the vicinity of the second opening.

4. The method of claim 3 where a concentration of the captured constituents by the travelling potential well is lower in the vicinity of the first opening than a concentration of the captured constituents in the vicinity of the second opening.

5. The method of claim 2 where the captured constituents are members of the group consisting of: ions, dipoles, polarized radicals, clusters, aggregates, colloidal particles, and charged solid particles.

6. The method of claim 1 where the at least one liquid medium comprises at least one ionizing compound dissolved in a supporting solutions.

7. The method of claim 6 where the at least one ionizing compound is chosen from the set of ionizing compounds consisting of inorganic ionizing compounds, mixtures of inorganic ionizing compounds, organic ionizing compounds, mixtures of organic ionizing compounds, and mixtures of inorganic and organic ionizing compounds.

8. The method of claim 6 where, the supporting solution is chosen from the set of solutions consisting of liquid organic compounds, liquid inorganic compounds, and mixtures of liquid organic compounds and liquid inorganic compounds.

9. The method of claim 6 where the supporting solution is chosen from the set of solutions consisting of water, methanol, ethanol, all isomers of propanol, acetonitrile, carbon dioxide, ammonia, methylethyl ketone, tehydrofuran, dimethylsulfoxide, and mixtures thereof.

10. The method of claim 6 where the dielectric medium is chosen from the set of solutions consisting of dielectric polymers, dielectric ceramics, vitreous dielectrics, dielectric composite materials, and mixtures and combinations thereof.

11. An electrokinetic apparatus for controlled transport of of at least one liquid medium comprising:
at least two volumes containing at least one liquid medium;
at least one dielectric medium with opposing dielectric surfaces in direct contact with the at least one liquid medium; at least one conduit arranged across the at least one dielectric medium, with a conduit inner surface surrounding a conduit volume and enclosing an enclosed portion of the at least one liquid medium, and at least a first opening and a second opening opposite to the first opening such that the at least one conduit is arranged to connect the at least two volumes containing the at least one liquid medium and the at least one conduit incorporates a set of at least three electrodes positioned in proximity of the inner conduit surface such that a dielectric layer separates the set of at least three electrodes from the enclosed portion of the at least one liquid medium; and
a power supply arranged to deliver and remove an electric charge distributed on each of the at least three electrodes such that the distribution of the electric charge on the each of at least three electrodes corresponds to a time-varying electric potential inside the conduit volume such that a superposition of the time-varying electric potentials represents at least one controllable traveling potential well arranged to travel between the first opening and the second opening opposite to the first opening, and to transfer an average momentum in a direction to the second opening to the enclosed portion of the at least one liquid medium such that the enclosed portion of the at least one liquid medium may be controllably transported between the at least two volumes.

12. The apparatus of claim 11, where the at least one dielectric medium is $Si_3N_4$.

13. The apparatus of claim 11, where the at least one dielectric medium is chosen from the set of dielectric media consisting of silicon dioxide, silicon nitride, silicon carbide, magnesium oxide, diamond, strontium titanate, lanthanum titanate, titanium dioxide, lead magnesium niobate, lead oxide, polvacrylate, polystyrene, polyvinyl chloride, polytetrafluoroethylene, amber, and mixtures thereof.

14. The apparatus of claim 11, where the set of at least three electrodes comprise conductors chosen from the set of conductors consisting of yttrium, titanium, zirconium, hafnium, vanadium, niobium, tantalum, chromium, molybdenum, tungsten, iron, cobalt, rhenium, iridium, nickel, palladium, platinum, copper, silver, gold, zinc, cadmium, aluminum, tin, lead, antimony, bismuth, and alloys thereof.

15. The apparatus of claim 11, where the at least one liquid medium includes at least two species of ionized constituents and the at least one conduit effective diameter is less than 1000 Debye lengths.

16. The apparatus of claim 11, where the at least one liquid medium includes at least two species of ionized constituents and the at least one conduit effective diameter is less than fifty Debye lengths.

17. The apparatus of claim 11, where the at least one conduit effective diameter is between 1 nm and 100 μm.

18. The apparatus of claim 11, where the at least one conduit effective length is between 100 nm and 1 mm.

19. The apparatus of claim 11, where the absolute maximum value of any time-varying electric potential does not exceed 5000 V.

20. The apparatus of claim 11, where the absolute maximum value of any time-varying electric potential does not exceed 1000 V.

21. The apparatus of claim 11, where the absolute maximum value of any time-varying electric potential does not exceed 500 V.

22. The apparatus of claim 11, where a time-dependent value of any time-varying electric potential is between −300 V and 300 V during the operation of the electrokinetic apparatus.

23. A method for manufacturing of an electrokinetic apparatus comprising steps of:
establishing at least two volumes containing at least one liquid medium by placing at least one conduit across at least one dielectric medium with opposing dielectric surfaces in direct contact with the at least one liquid medium by establishing at least one conduit across the at least one dielectric medium, with a conduit inner surface surrounding a conduit volume and enclosing an enclosed portion of the at least one liquid medium, and at least a first opening and a second opening opposite to the first opening such that the at least one conduit is arranged to connect the at least two volumes containing the at least one liquid medium and the at least one conduit incorporates a set of at least three electrodes positioned in proximity of the inner conduit surface such that a dielectric layer separates the set of at least three electrodes from the enclosed portion of the at least one liquid medium;
operatively connecting the at least three electrodes to a power supply arranged to deliver and remove an electric charge and distribute it on the each one of the at least three electrodes such that the electric charge on the each of at least three electrodes corresponds to a time-varying electric potential inside the conduit volume such that a superposition of the time-varying electric potentials represents at least one controllable traveling potential well arranged to travel between the first opening and the second opening opposite to the first opening, and to transfer an average momentum in a direction to the second opening to the enclosed portion of the at least one liquid medium such that the enclosed portion of the at least one liquid medium may be controllably transported between the at least two volumes;
wherein the step of establishing at least two volumes containing at least one liquid medium by placing at least one conduit across at least one dielectric medium includes sub-steps of:
preparing and cleaning a wafer, masking and patterning a back side of the wafer, insulating a front side of the wafer and depositing conductor/insulator multilayer over the insulation on the front side, etching an access well on the back side of the wafer, masking and patterning a device patterns over the multilayer, etching the device patterns, passivating conductors exposed by etching through the conductor/insulator multilayer.

24. The method of claim 23 where the wafer is a Si wafer.

25. The method of claim 23 where the multilayer is a $Ti/Si_3N_4$ multilayer comprising at least three Ti layers.

26. The method of claim 25 where the passivating is conducted by additional deposition of $Si_3N_4$.

* * * * *